US010853674B2

(12) United States Patent
Yamaoka et al.

(10) Patent No.: US 10,853,674 B2
(45) Date of Patent: *Dec. 1, 2020

(54) VEHICLE SYSTEMS AND METHODS FOR DETERMINING A GAZE TARGET BASED ON A VIRTUAL EYE POSITION

(71) Applicant: Toyota Research Institute, Inc., Los Altos, CA (US)

(72) Inventors: Masaaki Yamaoka, San Jose, CA (US); Yuki Horiuchi, Santa Clara, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 363 days.

This patent is subject to a terminal disclaimer.

(21) Appl. No.: 15/877,892

(22) Filed: Jan. 23, 2018

(65) Prior Publication Data
US 2019/0228242 A1 Jul. 25, 2019

(51) Int. Cl.
*G06K 9/00* (2006.01)
*G06F 3/03* (2006.01)
(Continued)

(52) U.S. Cl.
CPC ..... *G06K 9/00845* (2013.01); *G01C 21/3605* (2013.01); *G06F 3/013* (2013.01);
(Continued)

(58) Field of Classification Search
None
See application file for complete search history.

(56) References Cited

U.S. PATENT DOCUMENTS 9,823,744 B2  11/2017 George et al.
10,074,031 B2 * 9/2018 Krenzer ............ G06K 9/00597
(Continued)

FOREIGN PATENT DOCUMENTS

JP    6106402 B2       3/2017
JP    2017090615 A     5/2017
WO    2005023598 A1    3/2005

OTHER PUBLICATIONS

Zhenping Xia, Eli Peli, 30-1: Cyclopean Eye based Binocular Orientation in Virtual Reality, Book 1: Session 30: Input Technologies for AR/VR, First published: May 30, 2018, Available online: https://doi.org/10.1002/sdtp.12578| (Year: 2018).*
(Continued)

*Primary Examiner* — Tahmina N Ansari
(74) *Attorney, Agent, or Firm* — Dinsmore & Shohl LLP

(57) ABSTRACT

Vehicle systems and methods for determining a target position that a user is gesturing towards are disclosed. In one embodiment, a vehicle includes a user detection system configured to output a gesture signal in response to a hand of the user performing at least one gesture to indicate a target position, a user gaze monitoring system configured to output an eye location signal, one or more processors, and one or more non-transitory memory modules communicatively coupled to the one or more processors. The memory modules store machine-readable instructions that, when executed, cause the one or more processors to determine a point located on the hand of the user based at least in part on the gesture signal from the user detection system. The processors are also caused to determine an actual eye position of the user based on the eye location signal from the user gaze monitoring system.

20 Claims, 5 Drawing Sheets

(51) Int. Cl.
  *G01C 21/36* (2006.01)
  *G06F 3/01* (2006.01)
  *G06F 3/0484* (2013.01)
(52) U.S. Cl.
  CPC ............ *G06F 3/017* (2013.01); *G06F 3/0304* (2013.01); *G06F 3/04842* (2013.01); *G06K 9/00375* (2013.01); *G06K 9/00604* (2013.01)

(56) References Cited

U.S. PATENT DOCUMENTS

| | | | |
|---|---|---|---|
| 2010/0283722 A1* | 11/2010 | Thorn | .................. G06F 1/1626 345/156 |
| 2011/0267265 A1 | 11/2011 | Stinson | |
| 2014/0184494 A1 | 7/2014 | Burachas | |
| 2014/0226002 A1 | 8/2014 | Metzler et al. | |
| 2014/0361977 A1 | 12/2014 | Stafford | |
| 2015/0135144 A1 | 5/2015 | Kim | |
| 2015/0277700 A1 | 10/2015 | He | |
| 2016/0179205 A1 | 6/2016 | Katz | |
| 2016/0335475 A1 | 11/2016 | Krenzer et al. | |
| 2017/0032214 A1* | 2/2017 | Krenzer | .................. G06T 7/13 |
| 2017/0068322 A1* | 3/2017 | Steinberg | ................. G06F 3/017 |
| 2017/0147078 A1 | 5/2017 | van Laack et al. | |
| 2017/0228018 A1* | 8/2017 | Schaeferjohann | ........ G06T 7/11 |
| 2017/0329411 A1 | 11/2017 | van Laack et al. | |
| 2018/0088676 A1 | 3/2018 | Ach et al. | |
| 2019/0163268 A1 | 5/2019 | Shin et al. | |
| 2019/0210615 A1 | 7/2019 | Caron et al. | |
| 2019/0227635 A1* | 7/2019 | Yamaoka | ................ G06F 3/017 |
| 2019/0228242 A1* | 7/2019 | Yamaoka | ........... G06K 9/00604 |
| 2019/0228243 A1* | 7/2019 | Yamaoka | .............. G06F 3/0304 |
| 2019/0258318 A1 | 8/2019 | Qin et al. | |
| 2019/0318181 A1 | 10/2019 | Katz | |

OTHER PUBLICATIONS

Hiroshi Ono, Alistair P Mapp, Ian P Howard, The cyclopean eye in vision: the new and old data continue to hit you right between the eyes, Vision Research 42 (2002) 1307-1324, Vision Research, vol. 42, Issue 19, Sep. 2002, pp. 2331, https://doi.org/10.1016/S0042-6989(01)00281-4 (Year: 2002).*

Notice of Allowance dated Mar. 25, 2020 in related U.S. Appl. No. 15/877,906, 13 pages total.

Non-Final Office Action dated Dec. 31, 2019 in related U.S. Appl. No. 15/877,906, 14 pages total.

Notice of Allowance dated Apr. 1, 2020 in related U.S. Appl. No. 15/877,911, 11 pages total.

* cited by examiner

VEHICLE SYSTEMS AND METHODS FOR DETERMINING A GAZE TARGET BASED ON A VIRTUAL EYE POSITION

TECHNICAL FIELD

Embodiments described herein generally relate to vehicles and, more specifically, to vehicles having systems that determine a target position that a user is gesturing towards, where the user's gaze is directed towards a location other than the target position.

BACKGROUND

Some types of vehicle systems may allow a driver or passenger to provide input without manipulating buttons or other tactile inputs. More specifically, the vehicle may receive nonverbal communication from an individual using hand gestures. The vehicle includes sensors to detect the movement and position of an individual's hand, and determines the information the individual is attempting to convey based on the movement and position of the hand. However, some challenges may exist in certain situations that can limit the system's ability to interpret some of the information expressed by an individual's hands.

In addition to systems that allow for a driver to provide input based on hand gestures, some vehicles include an eye-tracking system that is capable of tracking the driver's gaze position. The driver's gaze position may be used to determine the driver's level of awareness as he or she is operating the vehicle. The driver normally directs his or her attention towards the environment located in front of the vehicle. Therefore, drivers typically direct their gaze away from the front of the road for only a few moments at a time while operating the vehicle. For example, a driver may turn his or her head to the side and look out of one of the side windows of a vehicle, but only for a few seconds. Accordingly, eye-tracking systems are limited in their ability to determine commands based on the gaze position of the driver.

SUMMARY

In one embodiment, a vehicle includes a user detection system configured to output a gesture signal in response to a hand of a user performing at least one gesture to indicate a target position, a user gaze monitoring system configured to output an eye location signal, one or more processors, and one or more non-transitory memory modules communicatively coupled to the one or more processors. The memory modules store machine-readable instructions that, when executed, cause the one or more processors to determine a point located on the hand of the user based at least in part on the gesture signal from the user detection system. The processors are also caused to determine an actual eye position of the user based on the eye location signal from the user gaze monitoring system. The processors are also caused to calculate a virtual eye position based at least in part by the point located on the hand of the user and the actual eye position of the user. The processors are caused to calculate the target position based on the virtual eye position. Finally, the processors are caused to control at least one vehicle system based at least in part on the target position.

In another embodiment, a vehicle includes a user detection system configured to output a gesture signal in response to a hand of a user performing at least one gesture to indicate a target position, a user gaze monitoring system configured to output an eye location signal and a direction signal indicative of a gaze direction of the user, one or more processors, and one or more non-transitory memory modules communicatively coupled to the one or more processors. The memory modules store machine-readable instructions that, when executed, cause the one or more processors to determine a point located on the hand of the user based at least in part on the gesture signal from the user detection system. The processors are further caused to determine the gaze direction of the user is directed towards a location other than the point located on the hand of the user. In response to determining the gaze direction is directed towards the location other than the point located on the hand of the user, the processors are caused to determine a position of a actual eye position of the user based on the eye location signal from the user gaze monitoring system. The processors are also caused to determine a first midpoint between a pair of eyes of the user of the user. The processors are further caused to determine a virtual eye position by rotating a head of the user about a vertical axis until the first midpoint between the pair of eyes of the user in aligned with the point located on the hand of the user. The processors are caused to calculate the target position based on the virtual eye position. Finally, the processors are caused to control at least one vehicle system based at least in part on the target position.

In yet another embodiment, a method for determining a target position that a user of a vehicle is gesturing towards is disclosed. The method includes determining, by a computer, a point located on a hand of the user based at least in part on a gesture signal from a user detection system. The method includes determining, by the computer, an actual eye position of the user based on an eye location signal from a user gaze monitoring system. The method includes calculating a virtual eye position based at least in part by the point located on the hand of the user and the actual eye position of the user. The method also includes calculating the target position based on the virtual eye position. Finally, the method includes controlling at least one vehicle system based at least in part on the target position.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein are directed to vehicle systems and methods to determine a target position that a user is pointing towards when his or her gaze is directed in a location other than the target position. In the embodiments as described in the present disclosure, the user is a driver of the vehicle. However, it should be appreciated that that the disclosure may also be applied towards a passenger of the vehicle as well.

When operating a vehicle, the driver normally directs his or her attention towards the environment located in front of the vehicle, and may turn his or her head momentarily to glance at objects located on either side of the vehicle. The driver may point or gesture towards a particular object or direction located in the surrounding using his or her hands, where the gesture may be used to convey information to one or more vehicle systems. For example, the driver may point towards a specific landmark, and the landmark is conveyed to a GPS or an interactive dialog system. However, since the driver is usually directing his or her attention towards the front of the vehicle, the direction of the driver's gaze may not align with the direction indicated by the hand. Furthermore, the driver's hand may not be pointing directly at the target position. The disclosed system determines the target position that the driver is attempting to gesture towards based on calculating a simulated or virtual position of the driver's eyes. The virtual position of the driver's eyes is aligned with a fingertip or other endpoint of the driver's hand in order to determine the target position.

The virtual eye position may be calculated by determining the location of the hand of the driver based at least in part on a gesture signal that is generated by a user detection system. The system also determines an actual position of the driver's eyes (i.e., the real position of the eyes) based at least in part on an eye location signal generated by a driver gaze monitoring system. The system then determines the virtual eye position by rotating the actual position of the driver's eyes about a vertical axis of the driver until a midpoint measured between the driver's eyes is aligned with the driver's fingertip. The position of the driver's eyes when aligned with the driver's fingertip represents the virtual eye position.

Once the virtual eye position is determined, the system may determine a directional vector that is oriented towards the target position. The directional vector originates at a midpoint measured between the virtual eyes of the driver. If the driver points to a particular object or group of objects, the system may employ object recognition logic or information from a GPS system to identify the items that the driver is gesturing towards.

Various embodiments of vehicles and methods for generating a virtual eye position to determine target position that the user is gesturing towards are disclosed below.

Figure 1:
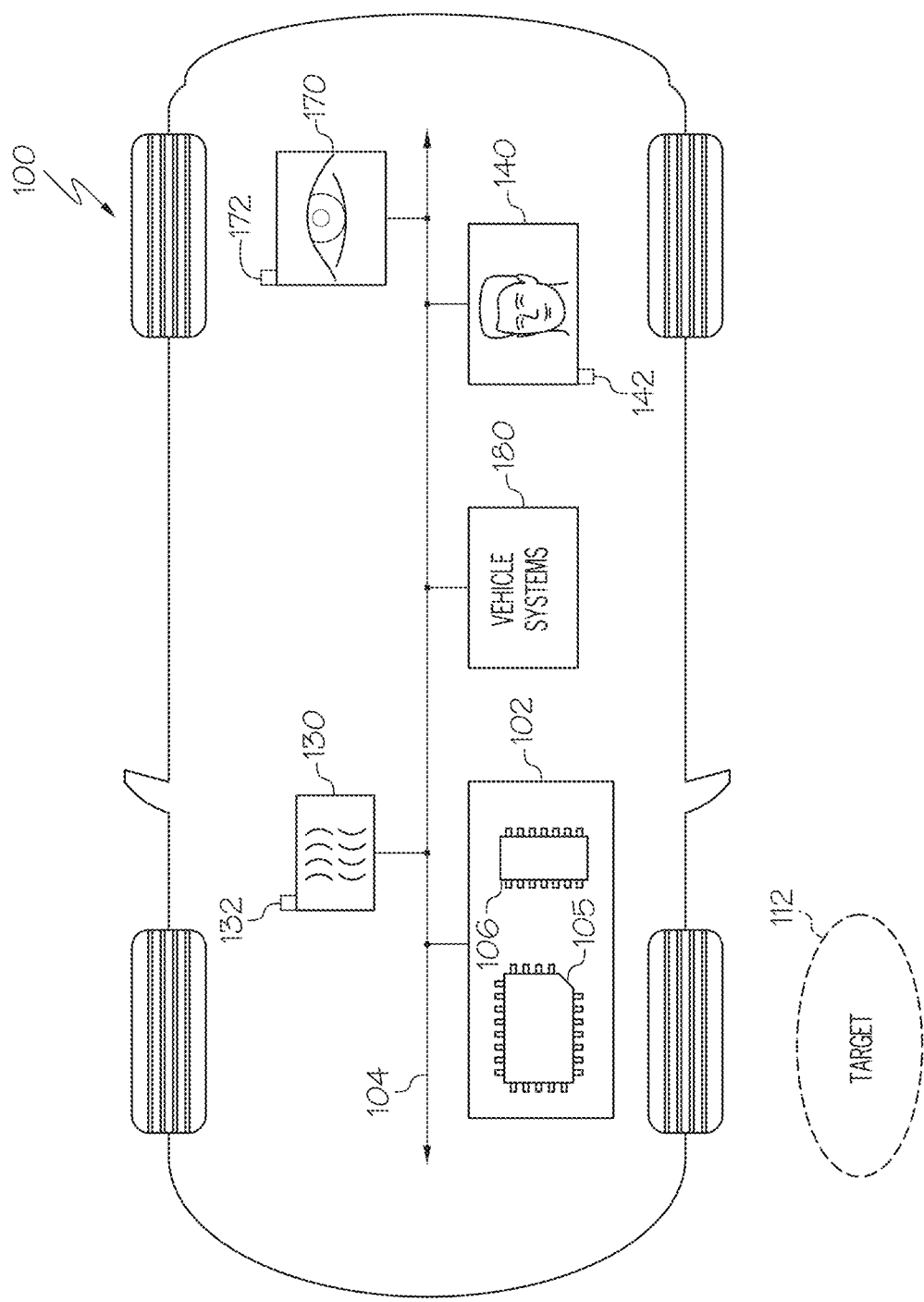
FIG. 1 depicts a schematic view of an example vehicle configured to determine a target position based on a virtual eye position of a user, according to one or more embodiments shown and described herein.

Referring now to FIG. 1, an embodiment of a vehicle 100 is schematically depicted. The vehicle 100 may be any passenger vehicle such as, for example, a terrestrial, aquatic, and/or airborne vehicle. The vehicle 100 includes a communication path 104, an electronic control unit 102, a user detection system 130, a driver detection system 140, a driver gaze monitoring system 170 (which may also be referred to as a user gaze monitoring system), and one or more vehicle systems 180. The electronic control unit 102 includes one or more processors 105 and one or more memory modules 106. As explained in detail below, the electronic control unit 102 is configured to calculate a target position 112 that is located in an environment surrounding the vehicle 100.

Figure 2:
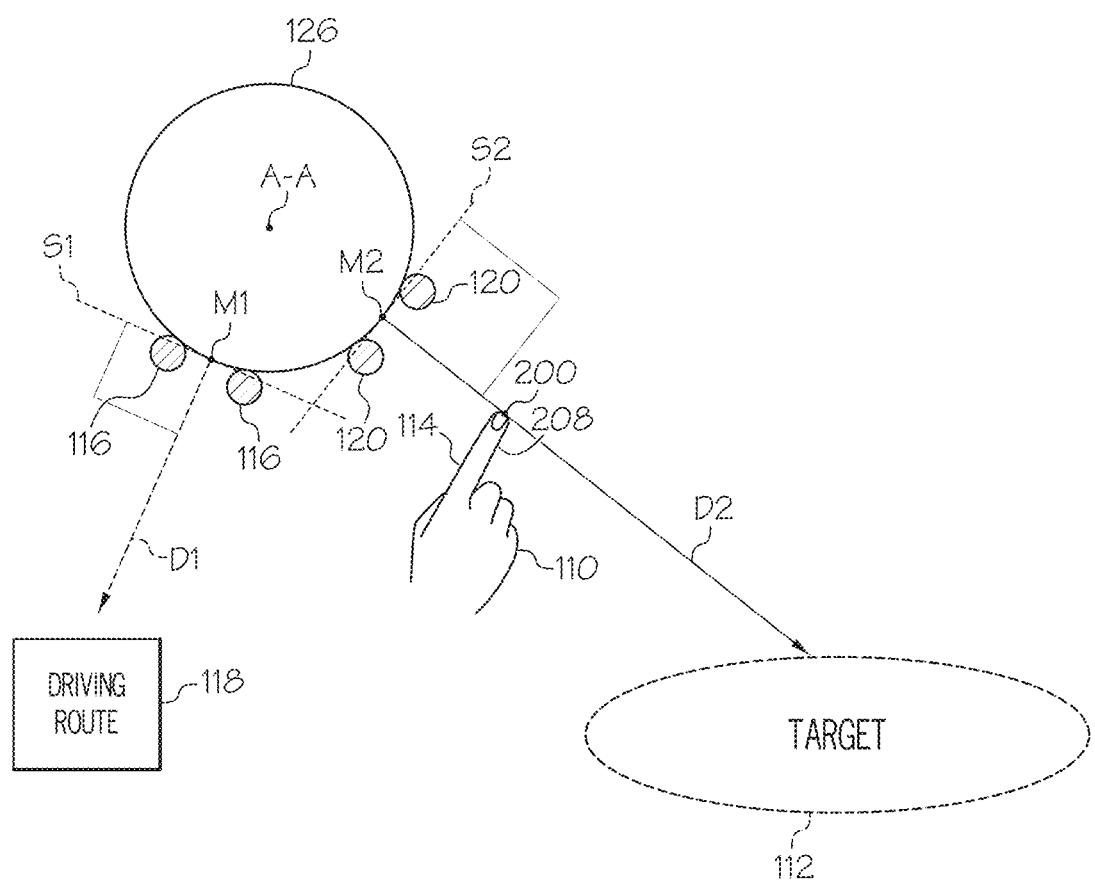
FIG. 2 depicts a schematic top view of a user of the vehicle pointing towards the target position, according to one or more embodiments shown and described herein.
Figure 3:
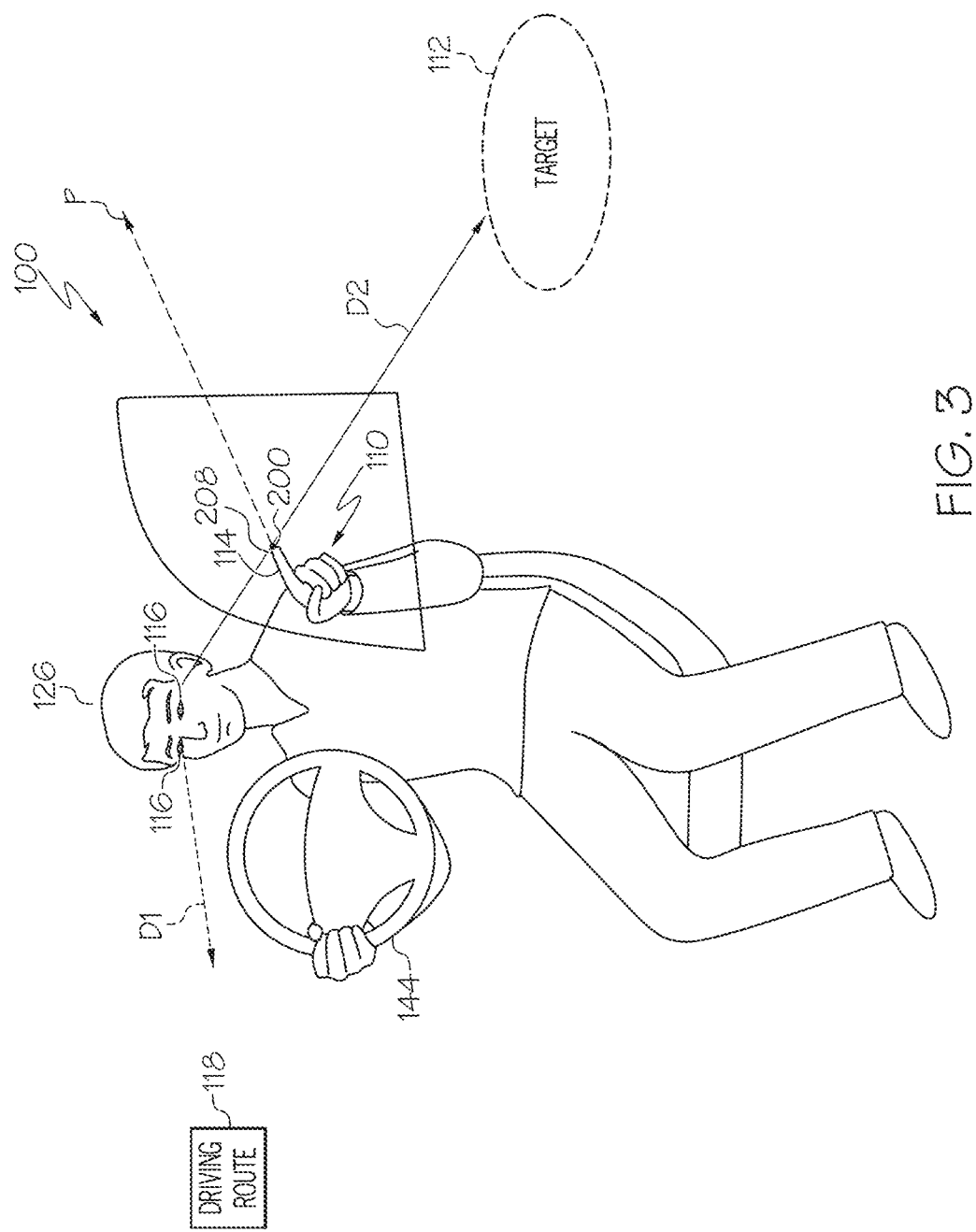
FIG. 3 is a perspective view of the user driving the vehicle and pointing towards the target position, according to one or more embodiments shown and described herein.

Referring now to FIGS. 1, 2, and 3, the target position 112 represents the location that a driver of the vehicle 100 is attempting to point or gesture towards using his or her hand 110. In one embodiment, the target position 112 may represent an object that the driver is pointing at, such as a person, an animal, a landmark, another vehicle, a building, and the like. FIG. 2 is a schematic top view illustrating a head 126 and a finger 114 of the driver, and FIG. 3 is a perspective view of the driver pointing towards the target position 112. More specifically, in the non-limiting embodiment as seen in FIGS. 2 and 3 the driver is attempting to point at the target position 112 using one of the fingers 114 on his hand 110, where the actual direction that the driver's hand is pointing towards is illustrated as a pointing direction P (FIG. 3). FIGS. 2 and 3 also illustrate a driver's gaze direction D1, which is directed towards a location that is different than the target position 112. For example, the driver's gaze direction D1 is directed towards a driving route 118 of the vehicle 100.

Referring to FIG. 1, the communication path 104 provides data interconnectivity between various modules disposed within the vehicle 100. Specifically, each of the modules may operate as a node that may send and/or receive data. In some embodiments, the communication path 104 includes a conductive material that permits the transmission of electrical data signals to processors, memories, sensors, and actuators throughout the vehicle 100. In some embodiments, the communication path 104 can be a bus, such as, for example, a LIN bus, a CAN bus, a VAN bus, and the like. In some embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. Moreover, the communication path 104 may be formed from a combination of mediums capable of transmitting signals. In some embodiments, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Still referring to FIG. 1, the electronic control unit 102 may be any computing device. For instance the electronic control unit 102 may be any type of vehicle-installed, handheld, laptop, or other form of single computing device, or may be composed of multiple computing devices. The electronic control unit 102 includes one or more processors 105 for controlling operations of the electronic control unit 102. The one or more processors 105 may include any device capable of executing machine-readable instructions stored on a non-transitory computer-readable medium.

Accordingly, each of the one or more processors 105 may include a controller, an integrated circuit, a microchip, a computer, and/or any other computing device.

The electronic control unit 102 further includes one or more memory modules 106 communicatively coupled to the one or more processors 105. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the electronic control unit 102 and/or external to the electronic control unit 102. The one or more memory modules 106 may be configured to store one or more pieces of logic as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. Logic stored on the one or more memory modules 106 may include, for example, object recognition logic, speech recognition logic, risk determination logic, notification generation logic, and autonomous vehicle control logic. Thus, the electronic control unit 102 includes logic to calculate the virtual eye position and then determine the location of the target position 112.

As noted above, the logic stored on the one or more memory modules 106 may include object recognition logic. The object recognition logic may include any known or yet-to-be-developed object recognition algorithms that may be utilized to detect objects within an environment. Example object recognition algorithms include, but are not limited to, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like). The logic stored on the electronic control unit may also include speech recognition logic used to detect the words spoken by the driver and/or passengers within the vehicle 100. Any known or yet-to-be-developed speech recognition algorithms may be used for the speech recognition logic.

In the embodiments described herein, the one or more memory modules 106 and the one or more processors 105 are integral with the electronic control unit 102. However, it is noted that the electronic control unit 102, the one or more memory modules 106, and the one or more processors 105 may be discrete components communicatively coupled to one another without departing from the scope of the present disclosure. As an example and not a limitation, one or more processors and one or more memory modules 106 of the electronic control unit 102 may be remote to the vehicle 100. For example, the vehicle 100 may be in wireless communication (e.g., using a wireless communication system) with a remote server storing logic and data that is configured to perform at least some of the functionalities described herein.

The user detection system 130 is communicatively coupled to the electronic control unit 102 over the communication path 104. The user detection system 130 may include any device configured to detect the presence of an object within the surrounding environment of the vehicle 100. More specifically, the user detection system 130 is configured to detect the presence of an object within the vicinity of the vehicle 100. The user detection system 130 may include a user detection sensor 132 configured to output an object signal indicative of the presence of one or more objects within the vicinity of the vehicle 100. Based on the object signal of the user detection sensor 132, the electronic control unit 102 may execute object recognition logic to detect an object and classify the detected object into a classification. The user detection sensor 132 may include, but is not limited to, a camera, a LiDAR sensor, a RADAR sensor, a sonar sensor, a proximity sensor, and the like. In some embodiments, the user detection system 130 includes more than one user detection sensor 132.

As explained below, the electronic control unit 102 calculates the target position 112. The electronic control unit 102 also classifies one or more objects located at the target position 112 based on the information provided by the object signal. More specifically, the electronic control unit 102 executes the object recognition logic to classify the type of object, where the object may be person, another vehicle, a building, and the like.

The driver detection system 140 is communicatively coupled to the electronic control unit 102 over the communication path 104. The driver detection system 140 may include any device configured to detect the presence, movements and/or actions of the driver of the vehicle 100. As such, the driver detection system 140 may include one or more driver detection sensors 142. The driver detection sensors 142 may include, but are not limited to, a camera with a field of view on a face and the surrounding area of the driver. Referring to FIGS. 1, 2, and 3, the driver detection sensors 142 are configured to output a gesture signal that is indicative of at least one point 200 located on the driver's hand 110. The gesture signal is created in response to the driver raising his or her hand 110 away from a steering wheel 144 of the vehicle 100 to point or otherwise draw attention to the target position 112. That is, the gesture signal is created in response to the driver gesturing towards one or more objects using his or her hand 110.

In the exemplary embodiment as shown in FIGS. 2 and 3, the point 200 of the driver's hand 110 represents a tip 208 of the driver's finger 114. More specifically, the point 200 is at the tip 208 of the driver's index finger 114. This is because the driver is gesturing towards the target position 112 by pointing his or her index finger 114 (which is seen in FIG. 3) towards the pointing direction P. Accordingly, the electronic control unit 102 would determine that the driver is pointing towards the target position 112 using his or her hand 110, and sets the point 200 as the tip 208 of the driver's index finger 114. Although the index finger 114 is described, it should be appreciated that the disclosure is not limited to gesturing towards the target position 112 using any particular finger of the hand 110. Instead, the driver may point using any digit or finger of the hand 110 (e.g., the thumb, ring finger, etc.), where the tip of one of the digits of the user's hand 110 represent the point 200.

In another embodiment, the point 200 may not be located on the driver's hand 110. Instead, the driver may grasp an article or item with his or her hand. The driver may then use the object to point towards an object. For example, instead of using his or her index finger 114 the driver may point towards the target position 112 using elongated articles such as a pen, a pencil, a stick, or the like. Therefore, the tip 208 of the driver's finger 114 is actually represented by an endpoint of the article that is being grasped by the driver. Specifically, a distal end defined by the article may be considered the tip 208 of the driver's finger 114. The distal end of the article points towards the target position 112, while a proximate end of the article is grasped by the driver. Furthermore, although elongated objects such as pencils and pens are described, the disclosure is not limited to elongated object. The driver may also gesture using any other article that is sized to be grasped by the hand 110 of the driver, and can be manipulated to point towards a particular direction. For example, the article may be an item that the driver usually wears or keeps nearby while driving the vehicle 100 such, but not limited to, as a cellular telephone, a pair of sunglasses, and the like.

Continuing to refer to both FIGS. 1 and 2, the driver gaze monitoring system 170 is communicatively coupled to the electronic control unit 102 over the communication path 104. The driver gaze monitoring system 170 may include any device configured to monitor the driver's gaze direction D1 and associated movement. More specifically, the driver gaze monitoring system 170 includes one or more devices to monitor a direction and motion of the eyes 116 of the driver relative to his or her head 126. As such, the driver gaze monitoring system 170 may include one or more eye tracking systems 172 configured to output a direction signal indicative of the driver's gaze direction D1. The eye tracking systems 172 may also output an eye location signal that indicates an actual position of the eyes 116 of the driver. As an example and not a limitation, the eye tracking system may include one or more cameras or some other optical sensors for detecting light reflected back from the driver's eyes. As a non-limiting example, the light reflected back from the driver's eyes may be near infrared light, which may range from about 700 nanometers to 2500 nanometers in the electromagnetic spectrum.

In response to receiving the eye location signal from the eye tracking systems 172, the electronic control unit 102 determines the position of the eyes 116 of the driver. The electronic control unit 102 then calculates a midpoint M1 between the two eyes 116 of the driver. More specifically, as seen in FIG. 2 the electronic control unit 102 calculates the midpoint M1 by determining a first line segment S1 relative to the driver's head 126. The first line segment S1 intersects both eyes 116 of the driver, is tangent with respect to the driver's head 126, and is substantially perpendicular with respect to the vector representing the driver's gaze direction D1. The midpoint M1 represents a middle point between the two eyes 116 of the driver that intersects the first line segment S1.

In the embodiment as shown in FIG. 2, the driver's head 126 is drawn as a circle for purposes of simplicity and clarity in the illustration. However, it should be appreciated that the illustration shown in FIG. 2 is not limiting. The electronic control unit 102 may calculate the line segment S1 and the midpoint M1 by modeling the driver's head using any number of shapes or profiles.

The electronic control unit 102 may then calculate a virtual eye position, which represents a simulated or virtual position of the driver's eyes. More specifically, as seen in FIG. 2 a pair of virtual eyes 120 of the driver is shown, where the virtual eyes 120 are directed towards the point 200 on the driver's hand 110. That is, the pair of virtual eyes 120 are directed towards the tip 208 of the finger 114. The electronic control unit 102 may calculate the position of the pair of virtual eyes 120 by rotating the actual position of the driver's eyes 116 about a vertical axis A-A of the head 126 of the driver until the midpoint M1 measured between the driver's eyes 116 is aligned with the point 200 located at the tip 208 of the driver's finger 114 when viewed in a plane substantially perpendicular to the axis A-A of the driver (i.e., a horizontal plane). In other words, the electronic control unit 102 simulates the driver turning his or her head 126 such that the virtual eyes 120 are positioned to see the target position 112. It should be appreciated that the vertical axis A-A of the driver's head 126 represents the vertical axis of the driver's body. The vertical extends from the head to the feet of a human's body. Furthermore, it should be understood that humans are capable of rotating about their respective vertical axis to perform a three hundred and sixty degree turn.

Figure 4:
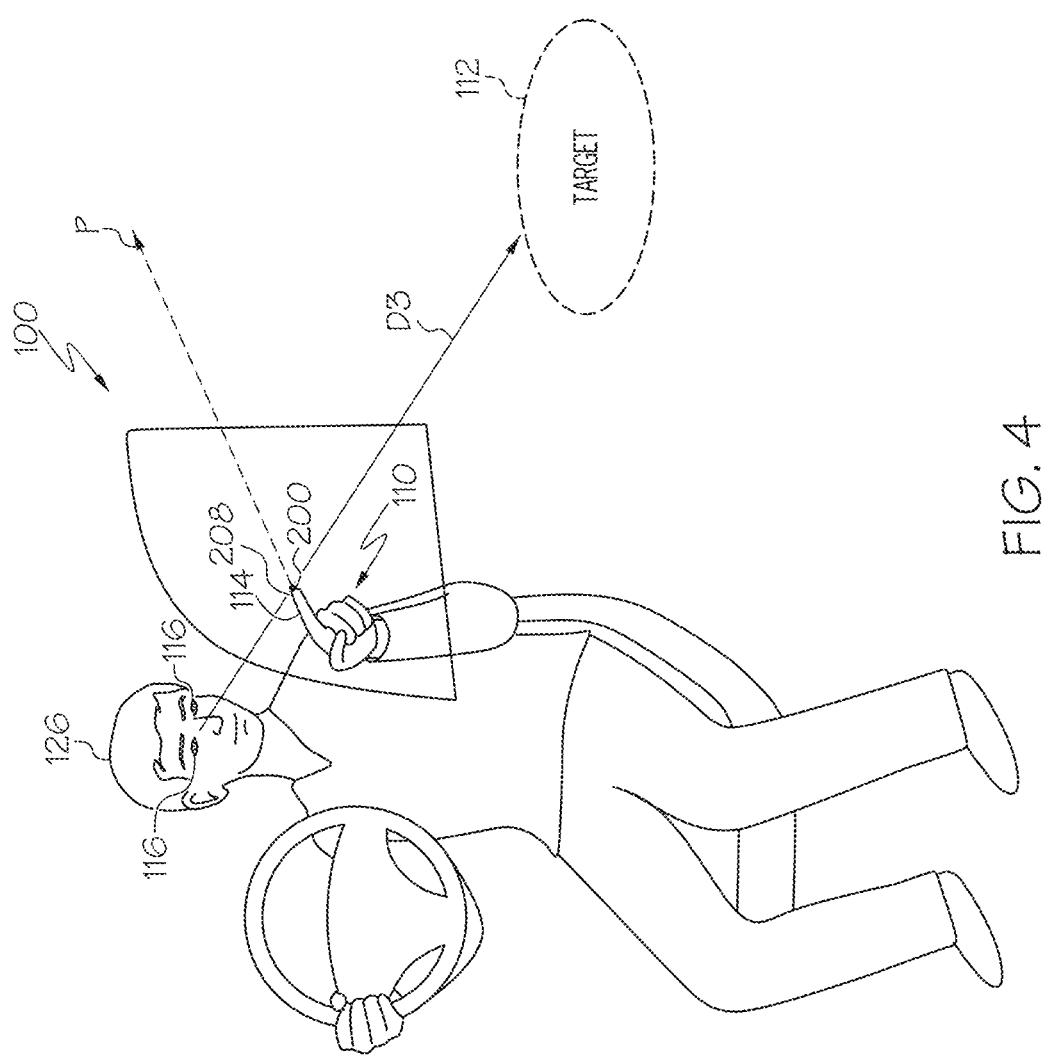
FIG. 4 is a perspective view of the user pointing towards the object and also directing his or her gaze towards the target position, according to one or more embodiments shown and described herein.

FIG. 4 illustrates the driver directing his or her gaze towards the target position 112 while also pointing in the pointing direction P. In other words, the driver has turned his or her head 126 such that his or her eyes 116 are aligned with the target position 112. More specifically, the driver's eyes 116 are directed towards a third gaze direction D3 that is aligned with the tip 208 of the driver's finger 114 and is directed towards the target position 112. Therefore, the driver is indicating the general direction of the target position 112 by pointing his or her finger 114 towards the direction P. The driver is also gazing past the tip 208 of his or her finger 114 towards the target position 112.

Turning back to FIGS. 2 and 3, a midpoint between the virtual eyes 120 of the driver is indicated as midpoint M2. The electronic control unit 102 calculates the midpoint M2 by first determining a second line segment S2 relative to the driver's head 126. The second line segment S2 intersects both of the virtual eyes 120 and is tangent with respect to the driver's head 126. The midpoint M2 represents a middle point between the two virtual eyes 120 that intersect the second line segment S2. In response to determining the midpoint M2 between the virtual eyes 120, the electronic control unit calculates a virtual gaze direction D2 of the driver. The electronic control unit 102 calculates the virtual gaze direction D2 by determining a vector that originates at the midpoint M2 and intersects the point 200 of the driver's hand 110. As seen in FIG. 2, the vector is substantially perpendicular with respect to the second line segment S2.

It should be appreciated that the virtual gaze direction D2 represents a simulated gaze direction of the driver, where the driver is looking towards the target position 112. That is, the virtual gaze position is a simulation of the driver's head 126 turned such that the eyes 116 would be directed towards the target position 112. More specifically, the virtual gaze direction D2 of FIG. 2 is the same as the third gaze direction D3 illustrated in FIG. 3. The third gaze direction D3 is aligned with the tip 208 of the driver's finger 114 and is directed towards the target position 112.

Referring back to FIG. 1, the electronic control unit 102 determines the target position 112 based on the object signal generated by the user detection system 130 and the virtual gaze direction D2. Specifically, the electronic control unit 102 determines one or more objects based on the object signal that intersect with the vector representing the virtual gaze direction D2, and identifies the object that intersects with the vector as the target position 112. The electronic control unit 102 may execute object recognition logic to classify the object. In one embodiment, the electronic control unit 102 may employ the object recognition logic configured to recognize specific landmarks. Some examples of landmarks that may be recognized include, but are not limited to, the Golden Gate Bridge in San Francisco, the Empire State Building in New York City, the Eiffel Tower in Paris, and the like.

The virtual gaze direction D2, the target position 112, and the object classified using object recognition logic are communicated to one or more vehicle systems 180 from the electronic control unit 102 via the communication path 104. The vehicle systems 180 may be controlled based on at least one of the virtual gaze direction D2, the target position 112, and the object classified using object recognition logic. The vehicle systems 180 may include, but are not limited to, a GPS system or an interactive dialog system. An interactive dialog system converses with the driver using text, speech, gestures, haptics, and the like. In one embodiment, the interactive dialog system may assist the driver with identifying objects located in the target position 112. For example, if the driver points towards the Empire State Building in New York City and asks "What am I pointing to?", then the interactive dialog system would answer back "The Empire State Building".

Figure 5:
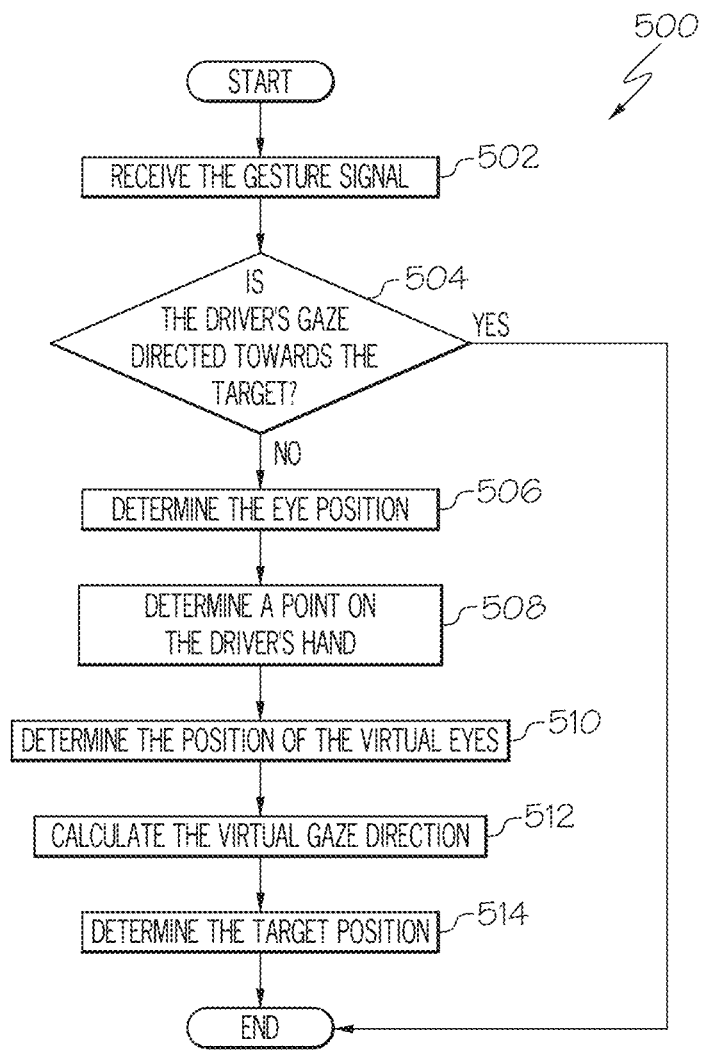
FIG. 5 depicts a flowchart of an example method for determining the target position based on the virtual eye position of the user, according to one or more embodiments shown and described herein.

Referring now to FIG. 5, a flowchart 500 depicting a method for determining the target position 112 that the driver is pointing towards is graphically depicted. As explained above, the driver's gaze is directed towards a location other than the target position 112. It should be understood that embodiments are not limited by the order of steps of the flowchart 500 of FIG. 5.

Referring generally to FIGS. 1, 2, 3, and 5, in block 502 of the flowchart 500 the electronic control unit 102 receives the gesture signal generated by the driver detection system 140. The gesture signal indicates that the driver is raising his or her hand 110 away from the steering wheel 144 of the vehicle 100 to point or otherwise draw attention to the target position 112. The method may then proceed to decision block 504.

In decision block 504, the electronic control unit 102 determines if the driver's gaze is directed towards the target position 112. More specifically, the electronic control unit 102 determines if the driver's gaze position D1 is directed towards the target position 112 based on the direction signal generated by the driver gaze monitoring system 170 and the point 200 on the driver's hand 110. If the driver's gaze direction D1 intersects the point 200, then the electronic control unit 102 determines that the driver's gaze direction D1 is directed towards the target position 112. The method may then terminate. However, if the electronic control unit 102 determines that the driver's gaze direction D1 does not intersect the point 200 on the driver's hand 110, then the method may proceed to block 506.

In block 506, the electronic control unit 102 determines the position of the driver's eyes 116 (FIG. 2) based on the eye location signal generated by the driver gaze monitoring system 170. The method may then proceed to block 508.

In block 508, the electronic control unit 102 determines the point 200 on the driver's hand 110 based on the gesture signal generated by the driver detection system 140. In the embodiment as illustrated, the point 200 represents the tip 208 of the driver's index finger 114. However, as explained above, the disclosure is not limited to the driver's index finger 114. In fact, the point 200 may be an object that the driver grasps in his or her hand such as a pen, a pencil, a pair of sunglasses, and the like. The method may then proceed to block 510.

In block 510, the electronic control unit 102 determines the position of the virtual eyes 120. Referring to FIG. 2, the virtual eyes 120 are calculated by rotating the actual position of the driver's eyes 116 about the vertical axis A-A of the driver's head 126 until the midpoint M1 measured between the driver's eyes 116 is aligned with the point 200 of the driver's finger 114. The method may then proceed to block 512.

In block 512, the electronic control unit 102 calculates the virtual gaze direction D2 by determining a vector that originates at the midpoint M2 and intersects the point 200 of the driver's hand 110. The method may then proceed to block 514.

In block 514, the electronic control unit 102 determines the target position 112 based on the object signal generated by the user detection system 130 and the virtual gaze direction D2. Specifically, the object detection system 130 determines the presence of objects located in the environment surrounding the vehicle 100 that intersect with the vector representing the virtual gaze direction D2, where the object or objects that intersect with the vector are identified as the target position 112. The method may then terminate.

It should now be understood that embodiments described herein are directed to vehicle systems that determine a target position that a driver or passenger of the vehicle is attempting to point or otherwise gesture towards. However, the individual pointing towards the target position is not looking at the target position directly. In other words, the individual's gaze is directed towards a location other than the target position that he or she is gesturing towards. In contrast, conventional systems are usually unable to determine the location that an individual's hand is gesturing towards unless the hand is pointing directly towards the target. Other conventional systems may be able to determine a target position only if the driver's gaze is also pointed directly towards the object. The disclosed system overcomes these challenges and does not require the user to be directly looking or pointing towards the object or location of interest.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A vehicle, comprising:
    a user detection system configured to output a gesture signal in response to a hand of a user performing at least one gesture to indicate a target position;
    a user gaze monitoring system configured to output an eye location signal;
    one or more processors; and
    one or more non-transitory memory modules communicatively coupled to the one or more processors and storing machine-readable instructions that, when executed, cause the one or more processors to perform at least the following:
       determine a point located on the hand of the user based at least in part on the gesture signal from the user detection system;

determine an actual eye position of the user based on the eye location signal from the user gaze monitoring system;
determine a midpoint between a pair of eyes of the user;
calculate a virtual eye position based at least in part on the point located on the hand of the user and the actual eye position;
calculate the target position based on the virtual eye position; and
control at least one vehicle system based at least in part on the target position.

2. The vehicle of claim 1, wherein the machine-readable instructions further cause the one or more processors to:
determine a midpoint measured between a pair of virtual eyes; and
determine a vector that originates at the midpoint and intersects the point located on the hand of the user, wherein the vector represents a virtual gaze direction of the user.

3. The vehicle of claim 2, wherein the machine-readable instructions further cause the one or more processors to:
determine a presence of an object located in an environment surrounding the vehicle that intersects with the vector representing the virtual gaze direction; and
identify the object that intersects with the vector as the target position.

4. The vehicle of claim 1, wherein the user gaze monitoring system is configured to output a direction signal indicative of a gaze direction of the user, and wherein the machine-readable instructions further cause the one or more processors to:
determine the gaze direction of the user is directed towards a location other than the point located on the hand of the user;
in response to determining the gaze direction is directed towards the location other than the point located on the hand of the user, determine the actual eye position of the user.

5. The vehicle of claim 1, wherein the machine-readable instructions further cause the one or more processors to:
determine that the user is pointing towards the target position by the hand, wherein the hand includes a plurality of digits that each define a respective tip; and
set the point located on the hand of the user to the respective tip of a digit.

6. The vehicle of claim 1, wherein the machine-readable instructions further cause the one or more processors to:
determine that the user is pointing towards the target position by an article defining a proximate end and a distal end, wherein the user grasps the proximate end of the article with the hand and the distal end of the article is directed towards the target position; and
set the point located on the hand of the user as the distal end of the article.

7. The vehicle of claim 1, wherein the machine-readable instructions further cause the one or more processors to:
calculate a position of a pair of virtual eyes by rotating a head of the user about a vertical axis until the midpoint between the pair of eyes is aligned with the point located on the hand of the user.

8. The vehicle of claim 7, wherein the machine-readable instructions further cause the one or more processors to:
determine a first line segment relative to the head of the user, wherein the first line segment intersects the pair of eyes and is tangent with respect to the head; and
set the midpoint to a middle point located between the pair of eyes that intersects the first line segment.

9. A vehicle, comprising:
a user detection system configured to output a gesture signal in response to a hand of a user performing at least one gesture to indicate a target position;
a user gaze monitoring system configured to output an eye location signal and a direction signal indicative of a gaze direction of the user;
one or more processors; and
one or more non-transitory memory modules communicatively coupled to the one or more processors and storing machine-readable instructions that, when executed, cause the one or more processors to perform at least the following:
determine a point located on the hand of the user based at least in part on the gesture signal from the user detection system;
determine the gaze direction of the user is directed towards a location other than the point located on the hand of the user;
in response to determining the gaze direction is directed towards the location other than the point located on the hand of the user, determine an actual eye position of the user based on the eye location signal from the user gaze monitoring system;
determine a first midpoint between a pair of eyes of the user;
determine a virtual eye position by rotating a head of the user about a vertical axis until the first midpoint between the pair of eyes of the user is aligned with the point located on the hand of the user;
calculate the target position based on the virtual eye position; and
control at least one vehicle system based at least in part on the target position.

10. The vehicle of claim 9, wherein the machine-readable instructions further cause the one or more processors to:
determine a second midpoint measured between a pair of virtual eyes; and
determine a vector that originates at the second midpoint and intersects the point located on the hand of the user, wherein the vector represents a virtual gaze direction of the user.

11. The vehicle of claim 10, wherein the machine-readable instructions further cause the one or more processors to:
determine a presence of an object located in an environment surrounding the vehicle that intersects with the vector representing the virtual gaze direction; and
identify the object that intersects with the vector as the target position.

12. The vehicle of claim 10, wherein the virtual gaze direction is a simulation of the head of the user being turned such that the pair of eyes of the user is directed towards the target position.

13. The vehicle of claim 9, wherein the machine-readable instructions further cause the one or more processors to:
determine that the user is pointing towards the target position by the hand, wherein the hand includes a plurality of digits that each define a respective tip; and
set the point located on the hand of the user to the respective tip of a digit.

14. The vehicle of claim 9, wherein the machine-readable instructions further cause the one or more processors to:
determine that the user is pointing towards the target position by an article defining a proximate end and a distal end, wherein the user grasps the proximate end of the article with the hand and the distal end of the article is directed towards the target position; and set the point located on the hand of the user to the distal end of the article.

15. The vehicle of claim 9, wherein the machine-readable instructions further cause the one or more processors to:
- determine a first line segment relative to the head of the user, wherein the first line segment intersects the pair of eyes of the user and is tangent with respect to the head; and
- set the first midpoint to a middle point located between the pair of eyes of the user that intersects the first line segment.

16. A method for determining a target position that a user of a vehicle is gesturing towards, the method comprising:
- determining, by a computer, a point located on a hand of the user based at least in part on a gesture signal from a user detection system;
- determining, by the computer, an actual eye position of the user based on an eye location signal from a user gaze monitoring system;
- determining a midpoint between a pair of eyes of the user,
- calculating a virtual eye position based at least in part on the point located on the hand of the user and the actual eye position;
- calculating the target position based on the virtual eye position; and
- controlling at least one vehicle system based at least in part on the target position.

17. The method of claim 16, further comprising:
- determining a midpoint measured between a pair of virtual eyes; and
- determining a vector that originates at the midpoint and intersects the point located on the hand of the user, wherein the vector represents a virtual gaze direction of the user.

18. The method of claim 17, further comprising:
- determining a presence of an object located in an environment surrounding the vehicle that intersects with the vector representing the virtual gaze direction; and
- identifying the object that intersects with the vector as the target position.

19. The method of claim 16, further comprising:
- determining a gaze direction of the user is directed towards a location other than the point located on the hand of the user based on a direction signal generated by the user gaze monitoring system;
- in response to determining the gaze direction is directed towards the location other than the point located on the hand of the user, determining the actual eye position of the user.

20. The method of claim 16, wherein the virtual eye position is calculated by:
- rotating a head of the user about a vertical axis until the midpoint between the pair of eyes in aligned with the point located on the hand of the user.

* * * * *